United States Patent [19]
Meyer

[11] Patent Number: 6,089,844
[45] Date of Patent: Jul. 18, 2000

[54] EXTRUSION DEVICE FOR RETREADING TIRES

[75] Inventor: Paul Meyer, Ascona, Switzerland

[73] Assignee: Firma A2-Formen-und Maschinenbau GmbH, Germany

[21] Appl. No.: 08/900,410

[22] Filed: Jul. 25, 1997

[30] Foreign Application Priority Data

Jul. 25, 1996 [DE] Germany ............................ 296 12 955

[51] Int. Cl.$^7$ ............................ B29C 47/12; B29C 47/78
[52] U.S. Cl. ............................ 425/17; 425/113; 425/224; 156/96; 156/405.1; 156/500
[58] Field of Search .......................... 425/17, 113, 224; 156/96, 405.1, 500, 909

[56] References Cited

U.S. PATENT DOCUMENTS

| | | | |
|---|---|---|---|
| 5,162,070 | 11/1992 | Meyer | 156/500 |
| 5,342,473 | 8/1994 | Bibona et al. | 156/394.1 |
| 5,458,727 | 10/1995 | Meyer | 156/405.1 |

FOREIGN PATENT DOCUMENTS 0637506  2/1995  European Pat. Off. .

Primary Examiner—David A. Simmone
Assistant Examiner—Robert A. Hopkins
Attorney, Agent, or Firm—Robert W. Becker & Associates

[57] ABSTRACT

An extrusion device for tires has a heatable extruder for extruding and supplying an elastomer to a prepared and rotatably supported carcass being rotated in a direction of rotation for entraining the extruded elastomer. The extruder has at least one die mouth facing a carcass sidewall. The mouth is a slot having a width and a length. The width extends in a direction of rotation of the carcass and is delimited by an upper and a lower edge. The length extends radially across the carcass sidewall. The slot has an outlet opening defining an area whose normal is slanted toward the carcass sidewall such that in the direction of rotation the upper edge of the slot is closer to the carcass sidewall than the lower edge of the slot.

12 Claims, 3 Drawing Sheets

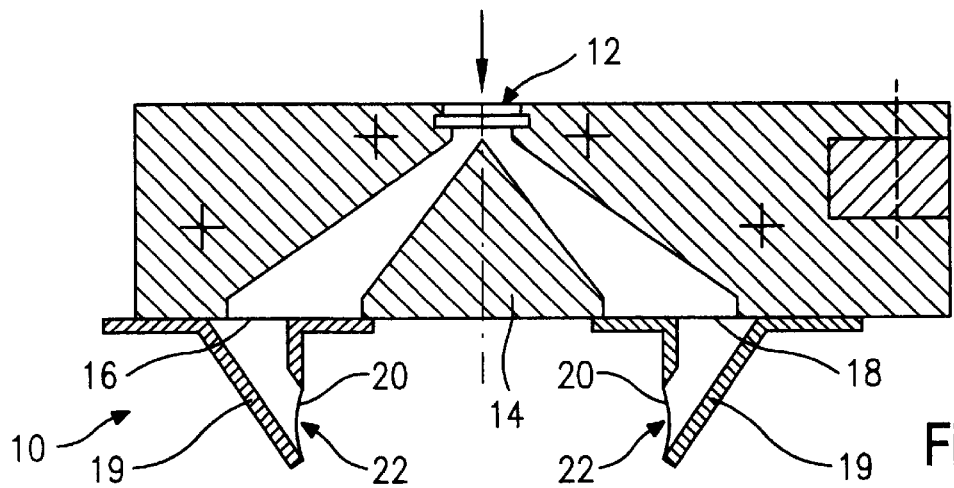
Fig. 1
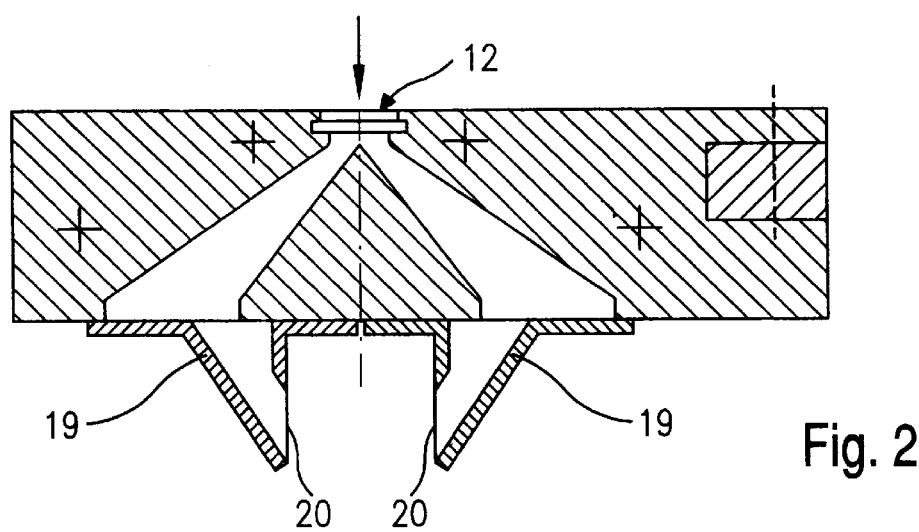
Fig. 2
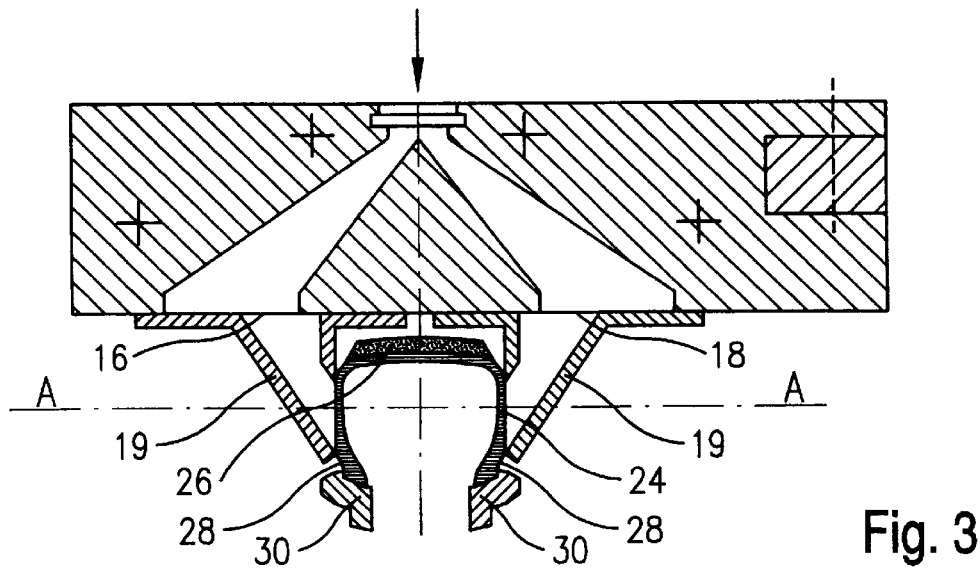
Fig. 3
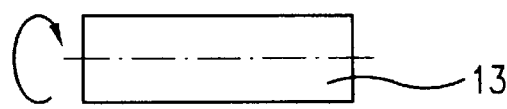

EXTRUSION DEVICE FOR RETREADING TIRES

BACKGROUND OF THE INVENTION

The invention concerns an extrusion device for tires.

The extrusion of tires, in particular, of car tires, is done in Europe—at least during the retreading—largely by the so-called bead-to-bead embodiment. In addition to the application of a new unvulcanized tread strip on the roughened outer surfaces, new sidewalls in the form of a calendered plate of 1 mm thickness are applied and stitched tight onto the flanks of the carcass, which are usually roughened by brushing only. In most cases, this embodiment requires the spraying of the brushed flanks with a rubber solution to provide assembly bonding of the new sidewall. The prepared carcass is then heated in the mold, wherein the tread design is molded into the tread strip and the company logo, tire size, and numbers representing the official tagging are molded into the sidewalls, followed by vulcanization.

The sidewall plate that has the required width and is provided on rolls having a cardboard core and an intermediate plastic layer, is practically applied to a slightly outwardly curved annular surface, resulting in a necessarily larger distance of the outer edge to the rotational axis of the tire than of the inner edge at the bead. Therefore, the plate must be pulled to a greater extent at the outside than at the inside. This is realized during manual application by means of special sidewall applicators and stitching machines.

When the plate is cut to length by a single cut, the required complete covering results in an at least triangular, or otherwise trapezoidal, overlapping at the "butt joint". If this overlap is not cut away by hand, the heating process in the mold results in a thicker portion. This is undesirable not so much because of balance error, but for visual reasons, i.e., selling considerations. Therefore, an additional cutting step of the butt joint is also unavoidable for automatic application devices, resulting in additional cost because of material waste in the form of the triangular or trapezoidal pieces of the sidewall plate and because of the manual labor requiring great care.

It is therefore an object of the invention to provide a retreading device that operates more cost-efficiently and eliminates, in particular, spraying of rubber solution onto the tire flanks that have been roughened by brushing.

SUMMARY OF THE INVENTION

In the case that the sidewall blend is chemically identical to the adhesive rubber blend, the inventive application may be performed simultaneously with the adhesive rubber or in a separate method step. In practice, the latter is the most preferred because the sidewall blend should be enriched with anti-aging components to protect against ozone and light.

Preferably, movable side parts are respectively embodied with two edges limiting the extrusion die. When looking in the direction of carcass movement, the trailing edge is protruding toward the carcass relative to leading edge. The edge closer to the carcass is embodied as a forming shoe and pressed against it by a tensioning force deforming the flanks.

The horizontal plane of the forming shoe may have a curvature that matches approximately the curvature of the carcass flanks or, expressed as a mean radius of curvature, is greater than the curvature of the flanks up to the infinite value, i.e., is flat.

According to another preferred embodiment, the forming shoe is provided with a rounded portion or chamfer having a depth that changes along to this curvature.

Accordingly, during operation, the sidewall rubber is extruded adjacent to this forming or applicator shoe so that a swelling forms at this location. From this location, the sidewall rubber is hydrodynamically pulled into the slot between the shoe and the rotating carcass, which is locally facilitated by the rounded portion or chamfer.

Thus, the swelling acts like a "rolling bank" in a rolling mill or a calender, from which "rolling block" or "swelling" sidewall rubber is pressed into the brush traces of the carcass flanks by the application pressure of the movable side parts. The high application pressure of the side parts presses the flank surfaces into a shape conforming to the curvature of the applicator shoe, i.e., into a flat shape according to a preferred embodiment.

A rounded portion that in the center is less deep or has a zero depth, but has larger depths, not necessarily symmetrically, toward the tread strip and the bead, results in peak pressures at these points, where the flexible flanks deform the least. By choosing the dimensions correctly, this leads surprisingly to an essentially uniform thickness of the sidewall rubber across the entire depth of the flanks.

From EP-A1-637 506, the extrusion of adhesive rubber and its pressurized application to the roughened outer surface of a carcass and also the adjustment of the depth of a chamfer according to the desired pressure distribution is known for application of prevulcanized tread strips. This embodiment results in several advantages in regard to the deep penetration of the adhesive rubber into the roughened traces and in regard to the automatic filling of grinding holes.

Because the side parts of the die mouth pieces are preferably easily exchangeable, a respectively formed pair of side parts may be employed for flanks of different width. Even if the length of the extrusion slot between the die lips could be embodied so as to be adjustable, at least within a range of 10–15 mm, the exchange and use of specifically formed side parts is the preferred solution with respect to the fact that the beads of the carcass have to be secured by metal pieces in a sealing manner relative to the internal pneumatic pressure. This may be achieved by an expansion rim having metal pieces distributed as segments around the circumference or by so-called rim flanges having metal edges extending along the entire circumference.

Therefore, the ends of the die mouth pieces pointing toward the bead may be embodied to have a specially tapered design in order to advance the sidewall as closely as possible toward the beads.

Instead of expansion rims or rim flanges, a solution already suggested much earlier may be employed according to which the carcass is only pressurized with inner supporting rollers or glide plates, instead of the internal pneumatic pressure, and only at the points to which the sidewall plate is to be attached. The carcass can be rotated by means of driven rollers that act against the tread strip from the inside. If necessary, the transmission of the rotational movement may be accurately adjusted, e.g., with the help of a sensor follower.

Another possible simplification is the embodiment of the radially arranged inner rollers as a cylinder instead of a barrel shape. The carcass flanks can be pressed truly flat, i.e., annularly shaped, against such cylinders. With glide plates that may be provided as a segment of an annulus, this embodiment may be realized even more simply. This, in turn, allows the direct advancement of the sidewall rubber to the laterally and radially projecting beads. This measure would also provide the option of providing an adjustable sidewall width on the side parts themselves.

BRIEF DESCRIPTION OF THE DRAWINGS

Additional details, advantages, and features result from the following description of preferred embodiments with the aid of the figures.

It is shown in:

FIGS. 1 and 2: Horizontal sections through an embodiment of an inventive extrusion device, respectively through the main die head with lateral die heads of the cushion-to-casing type in different adjustment widths, corresponding to wide and narrow tires;

FIG. 3: A section similar to FIG. 2 with the additional representation of a car tire carcass clamped onto a schematically shown expansion rim or onto a pair of rim flanges;

DESCRIPTION OF PREFERRED EMBODIMENTS

Figure 7:
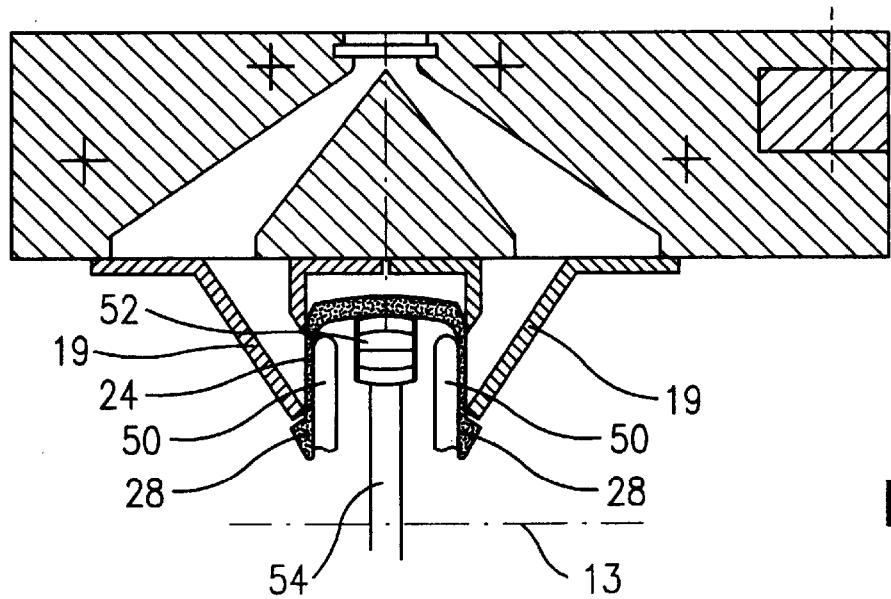
FIG. 7: A section of FIG. 3 through a car tire carcass that, in the area of the "application" to the sidewalls, is guided internally by stationary rollers or glide plates and is driven locally without being driven at the beads and without being filled with compressed air.

FIGS. 1, 2, and 3 show a horizontal section through the main die head 10 of the inventive retreading device that is supplied by a non-represented extruder with pressurized plastified, warm sidewall rubber through the inlet opening.

A distributor 14 covers the center of the main die head 10 and divides the rubber flow into two flows, also cross-sectionally shown, exiting through the slots 16 and 18 in the lateral die heads 19, respectively. These lateral die heads are mounted so as to be laterally moveable on the moveable main die head. In FIG. 1, the moveable lateral die heads are provided respectively with one die mouth 22 with template 20 having a curvature in the sectional plane. This curvature essentially corresponds to the curvature of the flanks or sidewalls of a carcass 24, but, expressed as a mean radius of curvature, is larger than the curvature on the outside of the carcass. By bringing the template closer, the sidewall is deformed, so that the template 7 contacts the entire sidewall.

In FIG. 1, the lateral die heads are shown spaced by 250 mm, and in FIG. 2 they are shown analogously spaced apart by 100 mm.

FIG. 2 also shows the templates 20 having a radius of curvature of an infinite value, i.e., the template is flat.

Additionally, FIG. 3 shows in section a carcass 24. A tread strip 26 has already been applied. The carcass 24 is clamped by its beads 28 onto an expansion rim or clamped between rim flanges 30 and filled with compressed air. Furthermore, a shaft 13 of the expansion rim or the rim flange 30 is schematically shown. Lateral die heads 19 are advanced closely to this carcass, so that they locally force the sidewalls of the carcass from their normally curved contour into a flat shape according to the template 20 shown in FIG. 2.

Figure 4:
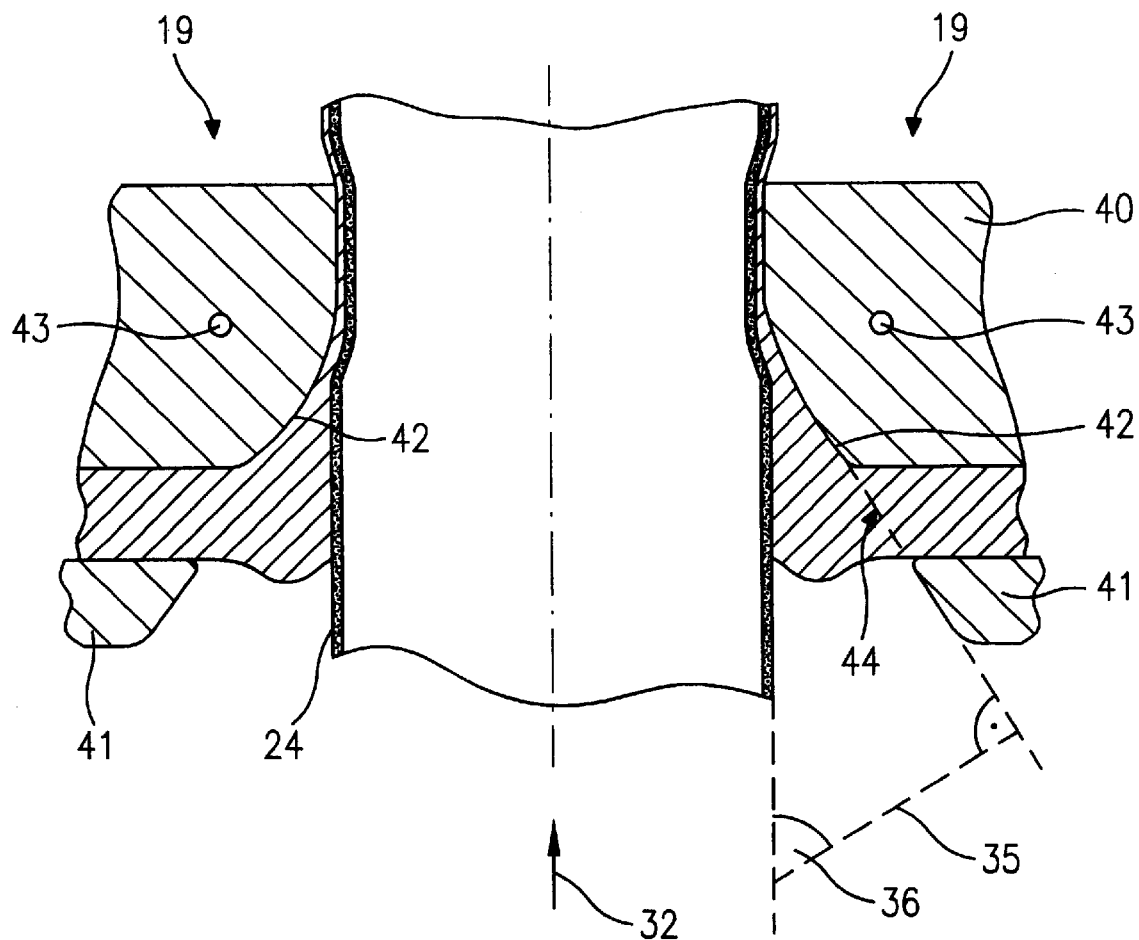
FIG. 4: A vertical section along section line A—A of FIG. 3.
Figure 5A:
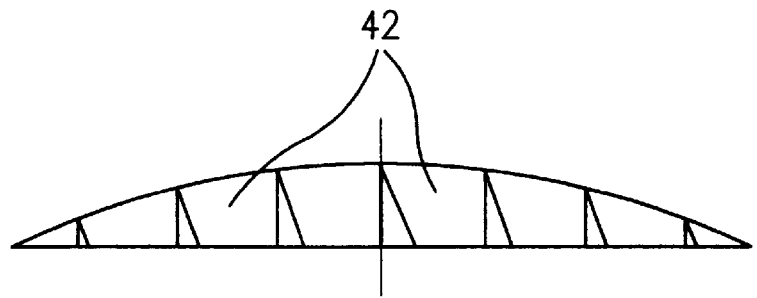
FIG. 5A: The pressure distribution under the forming shoe of FIG. 5.
Figure 5:
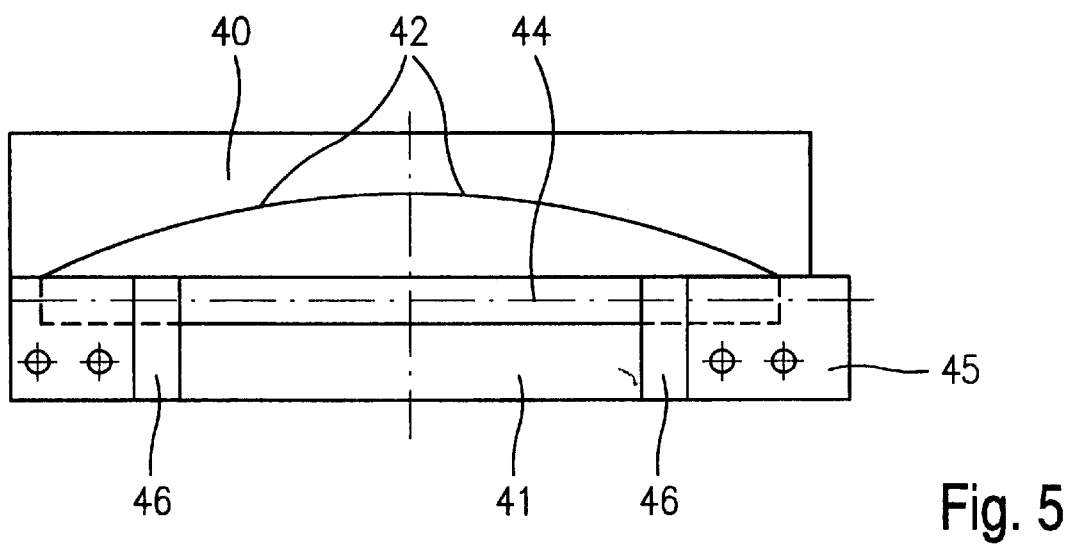
FIG. 5: A plan view of a forming shoe with representation of the chamfer at the forming shoe that produces a swelling in the center.
Figure 6A:
FIG. 6A: The pressure distribution under the forming shoe of FIG. 6.
Figure 6:
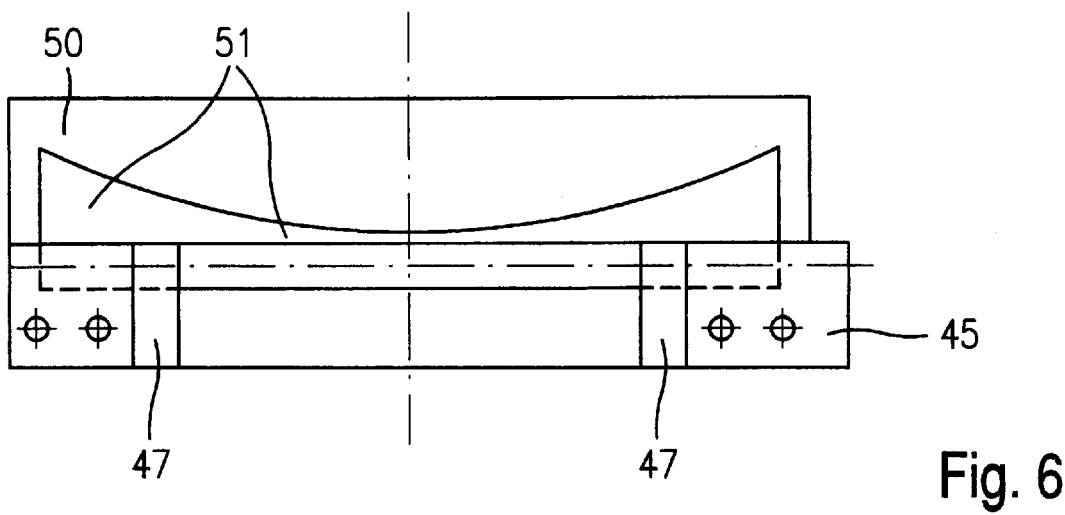
FIG. 6: In analogy to FIG. 5, a chamfer at the forming shoe that provides lateral swellings.

FIGS. 4, 5, and 6 show plan view of the embodiment of the lateral die heads 19 in greater detail, wherein FIG. 4 shows a lateral section and FIGS. 5 and 6 show front views. The downstream components of the die heads are shaped as a forming or applicator shoe 40 respectively and are spaced from the respective lower edges 41 of the lateral die heads 19 so that the slot width of the die for the rubber flow 44 is defined. The respective applicator shoe 40 also protrudes past the lower edge 41 toward the carcass by another spacing. In any case, these spacings are multiples of the mean thickness of the sidewalls to be applied.

The normal of an outlet opening 44 of the die mouth 22 or of the lateral die head 19 is slanted relative to the direction of movement 32 of the carcass. In FIG. 4, the normal 35 of the outlet opening 44 is represented as a dashed line. The angle 36 to the carcass surface is preferably approximately 60° and may be adapted within wide ranges to the specific requirements.

These features allow the extruder to operate against a lower die resistance with an extrusion temperature that is closer to the temperature used for conventional calendering of the sidewall and to provide a swelling of rubber adjacent to the applicator shoe 40.

A chamfer, bevel or rounded portion 42 of the respective applicator shoe 40 facilitates pulling of the rubber under the contact surface by the rotation of the carcass 24. Furthermore, the chamfer 42 has the effect that this swelling acts like a rolling bank or rubber roller in a rolling mill or calender, from which the sidewall layer is formed with a thickness that is determined by the size of the rolling bank as well as by the pressure between the lateral die heads and the flanks of the carcass.

An electrical heating element 43 may be provided to preheat the applicator shoe 40 to a temperature above the temperature of the rubber blend. The heating element may be used only during the application period of the adhesive rubber. This time period may be approximately a quarter of the entire application cycle, so that the temperature of the applicator shoe 40 can return to the temperature of the rubber blend of the main die head for the remaining time of the application cycle. In other words, heating is only used to support application or "stitching".

FIG. 4 also gives an impression of the deformation of the carcass flanks during the "stitching" at a carcass 24 that is mounted onto an expansion rim or onto rim flanges, filled with compressed air, and rotated by power transmission via the beads.

FIG. 5 shows a shape of the chamfer 42 that is deeper in the center and flatter toward the sides ant that is able to provide a swelling in the center of the sidewall. FIG. 5A indicates the pressure distribution across the width of the applicator shoe 40 in this case.

FIG. 6 shows a differently shaped forming or applicator shoe 50, whose chamfer 51 is smallest in the center and deepens toward the sides.

This has the purpose of compensating a swelling at the center of the sidewall that may be present due to too much deforming, or of making the sidewall rubber toward the tread strip, on the one hand, and the bead, on the other hand, than at the center.

FIG. 6A shows a respective pressure distribution.

These embodiments indicate that the thickness of the sidewall rubber may be controlled as desired, whereby, in addition to keeping the sidewall plate as thin and as uniform as possible in regard to thickness, the possibility exist to realize the embodiment of a chafer strip as part of the sidewall by forming the shoe and chamfer accordingly.

FIG. 7 shows an alternative to the embodiment with expansion rim or rim flange as a holder for the carcass, wherein same reference numbers identify the same parts as in FIGS. 1–3.

In this embodiment, radially arranged rollers 50, adjustable to the width of the carcass, or respective glide plates 50, circumferentially arranged opposite the applicator shoes, are shown relatively to the schematically shown shaft 13. Between the glide plates and the moveable lateral die heads 19, the sidewalls of the carcass 24 can locally be pressed flat. As shown, a holder of this kind may be used to deform the beads 28 outwardly so that the inner ends of the lateral die heads 19 can apply further down on the sidewalls of the carcass than would be possible with the embodiment shown in FIG. 3. Also, the sidewall contour may be kept flat safely from the inside in comparison to stationary glide plates or rollers 50. With an air-filled carcass under lateral pressure from the rubber roller, a central annularly depression is more likely and, consequently, an uncontrolled larger thickness at this point.

The carcass 24 is driven by a schematically shown friction wheel 52, which itself is driven via its holder 54. Preferably, two friction wheels 52 of this kind can be provided, which are arranged above and below the radial position of the glide plates or rollers 50.

These friction wheels 52 and other non-represented rollers, positioned external to the carcass and resting on the tread surface, allow, in addition to the drive feature, to hold the part of the carcass between the lateral die heads 19 stationary.

A possible variant provides the rotational drive of the carcass via two such external rollers as friction rollers, wherein the support function is provided by the inner wheels 52 opposite the friction rollers.

The present invention is, of course, in no way restricted to the specific disclosure of the specification and drawings, but also encompasses any modification within the scope of the appended claims.

What I claim is:

1. An extrusion device for tires, said extrusion device comprising:

a heatable extruder for extruding and supplying an elastomer to carcass sidewalls of a prepared and rotatably supported carcass being rotated in a direction of rotation for entraining the extruded elastomer;

said extruder comprising a first die mouth and a second die mouth, wherein said first die mouth faces a first carcass sidewall and said second die mouth faces a second carcass sidewall;

each one of said die mouths being a slot having a width and a length;

said width extending in a direction of rotation of the carcass and delimited by an upper and a lower edge;

said length extending radially across the carcass sidewall and matching a radial height of the first and second carcass sidewalls, respectively;

said slot having an outlet opening defining an area whose normal is slanted toward the carcass sidewall such that in the direction of rotation said upper edge of said slot is closer to the carcass sidewall than said lower edge of said slot.

2. An extrusion device according to claim 1, wherein one of said first die mouth and said second die mouth comprises a forming shoe adjacent to said upper edge of said outlet opening, wherein said forming shoe presses against the carcass sidewall.

3. An extrusion device according to claim 1, wherein one of said first die mouth and said second die mouth is heatable.

4. An extrusion device according to claim 2, wherein said forming shoe is heatable.

5. An extrusion device according to claim 1, wherein said normal of said outlet opening is slanted at an angle of 5–45°.

6. An extrusion device according to claim 5, wherein said normal of said outlet opening is slanted at an angle of 10–30°.

7. An extrusion device according to claim 6, wherein said normal of said outlet opening is slanted at an angle of 20°.

8. An extrusion device according to claim 1, wherein said first and second die mouths have an adjustable spacing to one another.

9. An extrusion device according to claim 2, wherein said forming shoe has a surface that is essentially flat in a radial direction of the carcass.

10. An extrusion device according to claim 1, further comprising a rotational drive for the carcass, said rotational drive comprising a friction wheel applying pressure to the carcass from the inside against a tread strip area of the carcass.

11. An extrusion device according to claim 2, comprising glide plates and rollers that extend on the inside along the entire axial length of the carcass sidewall and press the carcass sidewall against said forming shoe.

12. An extrusion device according to claim 1, wherein one of said first die mouth and said second die mouth extends to a bead area of the carcass sidewall.

* * * * *

UNITED STATES PATENT AND TRADEMARK OFFICE
CERTIFICATE OF CORRECTION

PATENT NO  : 6,089,844
DATED      : July 18, 2000
INVENTOR(S): Paul Meyer

It is certified that error appears in the above-identified patent and that said Letters Patent are hereby corrected as shown below:

On the title page, the following item should read as follows:

[73] Assignee:

Firma AZ-Formen-und Maschinenbau GmbH

Signed and Sealed this

Seventeenth Day of April, 2001

Attest:

NICHOLAS P. GODICI

Attesting Officer

Acting Director of the United States Patent and Trademark Office